United States Patent
La et al.

(10) Patent No.: US 7,254,403 B2
(45) Date of Patent: Aug. 7, 2007

(54) WIRELESS TERMINAL-INTEROPERABLE HOME NETWORK SYSTEM

(75) Inventors: In Hwan La, Kyungki-do (KR); Oh Sung Kwon, Kyungki-do (KR)

(73) Assignee: LG Electronics Inc., Aeoul (KR)

( * ) Notice: Subject to any disclaimer, the term of this patent is extended or adjusted under 35 U.S.C. 154(b) by 199 days.

(21) Appl. No.: 10/759,018

(22) Filed: Jan. 20, 2004

(65) Prior Publication Data

US 2004/0152460 A1 Aug. 5, 2004

(30) Foreign Application Priority Data

Jan. 21, 2003 (KR) ............ 10-2003-0003985

(51) Int. Cl.
  *H04Q 7/20* (2006.01)
(52) U.S. Cl. ............... 455/456.1; 455/456.1; 455/456.2; 340/310.01; 340/310.08; 340/3.1; 340/531; 340/825.71; 700/19; 700/65; 700/66
(58) Field of Classification Search .......... 455/456, 455/414, 466, 556, 557, 420; 700/19, 20, 700/65, 66
See application file for complete search history.

(56) References Cited

U.S. PATENT DOCUMENTS

| | | | | |
|---|---|---|---|---|
| 5,875,395 | A * | 2/1999 | Holmes ............... | 455/420 |
| 6,021,324 | A * | 2/2000 | Sizer et al. ........... | 455/403 |
| 6,252,883 | B1 * | 6/2001 | Schweickart et al. ... | 370/441 |
| 6,308,062 | B1 * | 10/2001 | Chien et al. .......... | 455/420 |
| 6,356,761 | B1 * | 3/2002 | Huttunen et al. ...... | 455/456.1 |
| 6,507,762 | B1 * | 1/2003 | Amro et al. .......... | 700/83 |
| 6,519,241 | B1 * | 2/2003 | Theimer .............. | 370/338 |
| 6,871,063 | B1 * | 3/2005 | Schiffer .............. | 455/410 |
| 2003/0034885 | A1 * | 2/2003 | Catton et al. ........ | 340/506 |
| 2003/0065407 | A1 * | 4/2003 | Johnson et al. ...... | 700/19 |
| 2003/0073432 | A1 * | 4/2003 | Meade, II ........... | 455/420 |

\* cited by examiner

*Primary Examiner*—William Trost
*Assistant Examiner*—Julio Perez
(74) *Attorney, Agent, or Firm*—Greenblum & Bernstein, P.L.C.

(57) ABSTRACT

Disclosed herein is a home network system interoperable with a wireless terminal of at least one user registered therein, wherein a terminal server is adapted to transmit and receive data to/from the wireless terminal, and a home server is adapted to manage/control a home network and communicate with the terminal server. The terminal server detects the position of the wireless terminal and transmits and receives voice messages, text messages or multimedia data to/from the wireless terminal. The home server is connected with the terminal server over the Internet. The home server sends, to the terminal server, alarm data regarding a dangerous situation in a home where the home network is constructed, receives information regarding the position of the wireless terminal from the terminal server and displays the received position information. Therefore, a home network system user can ascertain the position of a member of his/her family carrying the wireless terminal, not at home, through the home server in the home and notify the family member of a dangerous situation occurring in the home through the wireless terminal. This has the effect of strengthening child protection and security in the home.

10 Claims, 4 Drawing Sheets

WIRELESS TERMINAL-INTEROPERABLE HOME NETWORK SYSTEM

BACKGROUND OF THE INVENTION

1. Field of the Invention

The present invention relates to home network systems interoperable with wireless terminals, and more particularly to a wireless terminal-interoperable home network system wherein a home server is provided to manage the home network system, and a wireless terminal located at a remote site is interoperable with the home server, thereby enabling a user to rapidly recognize a situation in a home from anywhere outside of the home and to ascertain the position of a member of his/her family, not at home, when he/she is present in the home.

2. Description of the Related Art

In home network systems, generally, a plurality of home appliances installed in each home are equipped with network interfaces, respectively, so that they can be networked so as to be controllable over an internal network. The internal network may employ a power line or local area network (LAN) line, but is not limited thereto herein.

With the rapid spread of the Internet, followed by the significant increase in the number of Internet users, recently, home servers for management/control of home network systems have been equipped with Internet modems so that home appliance users can not only collect information over the Internet in homes, but also access the home servers over the Internet from remote locations to control home appliances connected to internal networks.

The configuration of one such conventional home network system will hereinafter be described with reference to FIG. 1.

A plurality of home appliances are connected in common to an internal network (referred to hereinafter as a 'home network') constructed in a home, and equipped respectively with network interfaces 1 that enable the corresponding home appliances to transmit and receive data over the home network.

The home appliances equipped with the network interfaces 1 are controlled or monitored by a home server 2, which manages the flow of data transmitted and received over the home network. The home server 2 is connectable with the Internet as long as it is equipped with a network modem.

Therefore, a home appliance user can control the plurality of home appliances connected to the home network from a remote location by accessing the home server 2 over the Internet from the remote location and sending control commands thereto, through the use of an Internet accessible control device such as a personal computer (PC) or notebook computer.

However, the above-mentioned conventional home network system has a disadvantage in that the user can check state information of the home appliances connected to the home network only when accessing the home server by operating an Internet accessible control device, so he/she cannot readily monitor the states of the home appliances from the remote location when he/she has difficulty in using a PC because of his/her movement or the Internet is inaccessible.

For this reason, unless the user artificially accesses the home server 2 using a control device such as a PC, he/she has a limitation in recognizing a dangerous situation occurring in the home in his/her absence. As a result, provided that the user is out for a short time leaving his/her baby alone in the home or stays away from the home for a long time, he/she will be anxious that an outsider may intrude into the home.

In particular, even in the case where a dangerous situation requiring immediate attention, such as a fire or gas leak, occurs in the home, the user cannot recognize it unless he/she accesses the home server 2 over the Internet, resulting in a concern that the dangerous situation could lead to a major accident.

SUMMARY OF THE INVENTION

Therefore, the present invention has been made in view of the above problems, and it is an object of the present invention to provide a wireless terminal-interoperable home network system wherein a home server is provided to manage/control a home network, an alarm unit is connected to the home server to sense a dangerous situation in a home and send the resulting alarm data to a terminal server via the home server, and the terminal server is adapted to transmit the alarm data to a wireless terminal of a user registered in the home network system and detect the position of the registered user outside of the home.

In accordance with the present invention, the above and other objects can be accomplished by the provision of a home network system interoperable with a wireless terminal of at least one user registered therein, comprising: a terminal server for detecting a position of the wireless terminal and transmitting and receiving voice messages, text messages or multimedia data to/from the wireless terminal; and a home server connected with the terminal server over the Internet, the home server sending, to the terminal server, alarm data regarding a dangerous situation in a home where a home network is constructed, receiving information regarding the position of the wireless terminal from the terminal server and displaying the received position information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
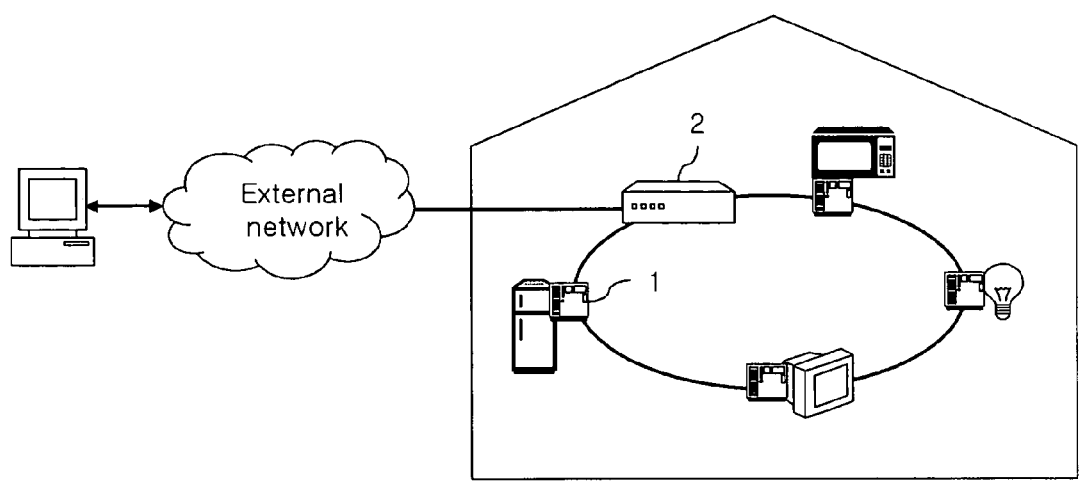
FIG. 1 is a view showing the configuration of a conventional home network system.
Figure 2:
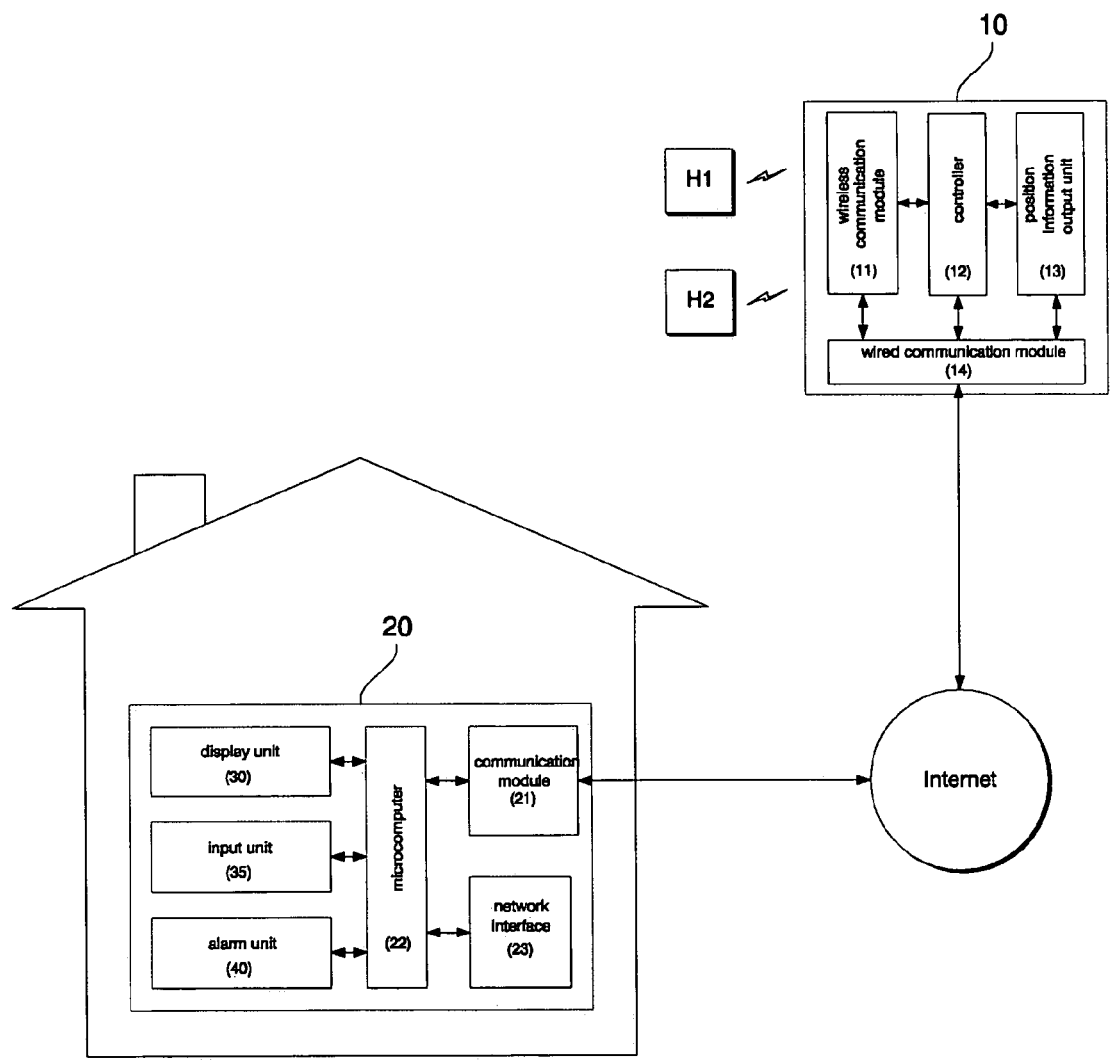
FIG. 2 is a block diagram showing the configuration of a first embodiment of a wireless terminal-interoperable home network system according to the present invention.
Figure 3:
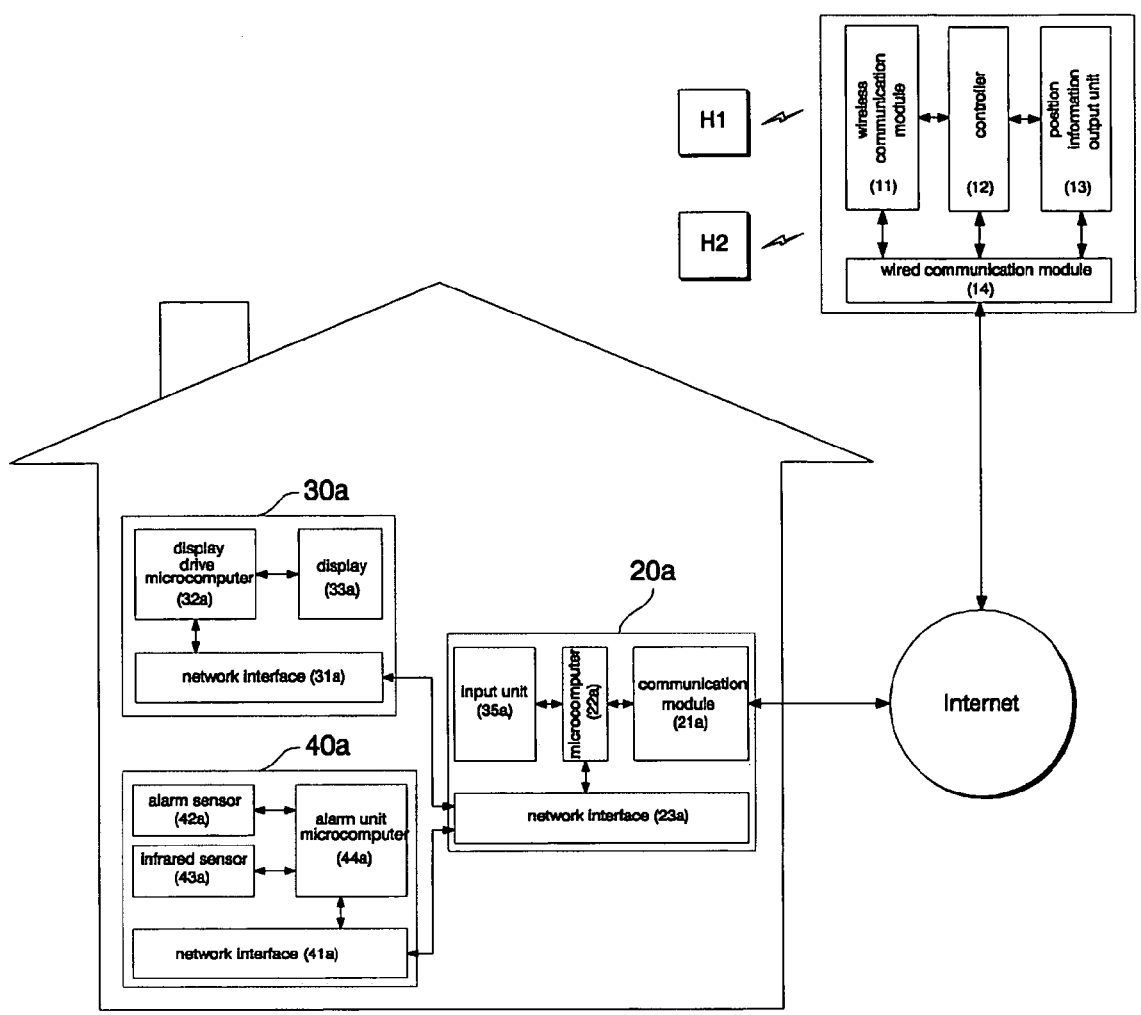
FIG. 3 is a block diagram showing the configuration of a second embodiment of the wireless terminal-interoperable home network system according to the present invention.
Figure 4:
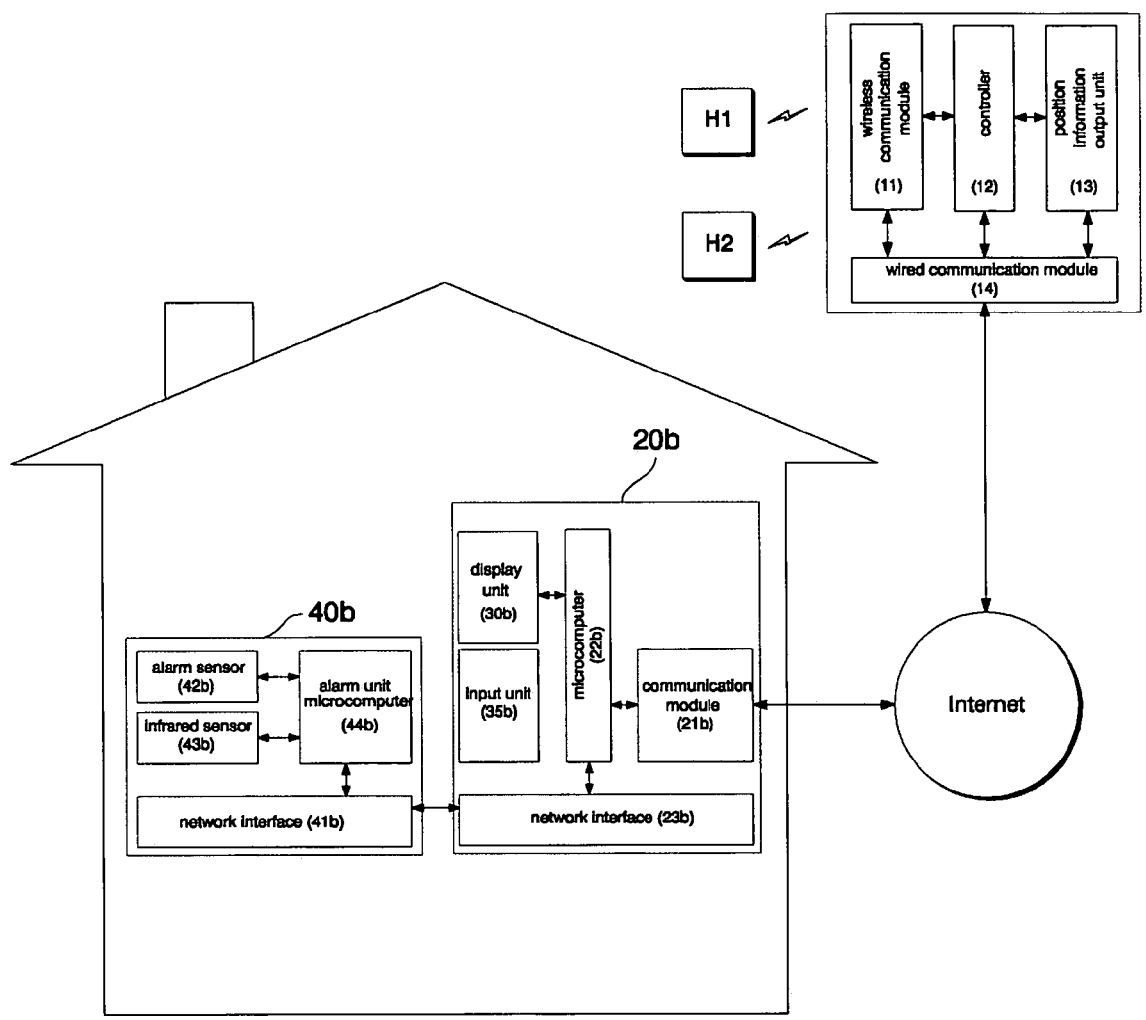
FIG. 4 is a block diagram showing the configuration of a third embodiment of the wireless terminal-interoperable home network system according to the present invention.

FIGS. 2 to 4 show first to third embodiments of a wireless terminal-interoperable home network system according to the present invention, respectively.

The wireless terminal-interoperable home network system according to the present invention comprises a terminal server 10 for processing voice or text messages transmitted and received between a plurality of wireless terminals H1 and H2 and relaying voice messages transmitted and received between the wireless terminals H1 and H2 and wired telephones. The terminal server 10 is also adapted to transmit time information to the wireless terminals H1 and H2 of subscribers thereto in real time through wireless communications with the terminals H1 and H2 to maintain call standby states thereof.

Subscriber information and subscribed terminal information are stored in a database linked with the terminal server 10. On the basis of the information stored in the database, the terminal server 10 provides a text message transmission service, subscriber position tracking service or etc. on a Web page. That is, the terminal server 10 can perform wireless communications with a plurality of wireless terminals over a wireless network and wired communications with a plurality of subscribers on the Web page over the Internet.

To this end, the terminal server 10 includes a wireless communication module 11 for transmitting data containing subscriber terminal position information, a text message and multimedia information to each of the wireless terminals H1 and H2 and receiving data transmitted from each of the wireless terminals H1 and H2, and a controller 12 for controlling the data transmission and reception of the wireless communication module 11 with the wireless terminals H1 and H2.

The terminal server 10 further includes a position information output unit 13 for, under the control of the controller 12, reading and analyzing the position information contained in the data transmitted and received to/from each of the wireless terminals H1 and H2 and transmitting the analysis result to a home server 20, which manages a home network constructed in a home. The terminal server 10 further includes a wired communication module 14 composed of an Internet accessible network modem. Thus, the terminal server 10 can transmit and receive data over the Internet to/from one or more home servers 20 requesting communication therewith.

The home server 20 includes a microcomputer 22 for processing data for state monitoring or operation control of a plurality of home appliances which are connected to the home network constructed in the home to transmit and receive data over the home network in real time, a network interface 23 for interfacing with the home appliances, and a memory (not shown) for storing networked information and product information of the home appliances and information of users registered in the home network system.

The home server 20 further includes an input unit 35 for receiving a control command inputted from a home network system user, and a display unit 30 for displaying state information of at least one of the home appliances operated in response to the control command, or data transmitted and received to/from the terminal server 10.

The input unit 35 can be implemented in a touch screen manner in which it is integrally formed with the display unit 30. The display unit 30 can be implemented by a monitor or touch screen connected to the body of the home server 20, or a Web pad detachably mounted on the home server body. Alternatively, the display unit 30 may be implemented by a stand-alone image output device such as a computer monitor or TV. That is, the display unit 30 can be a subordinate monitor device directly connected with the home server 20, or a stand-alone monitor device indirectly controllable over the home network.

The home server 20 further includes a communication module 21 connected to the terminal server 10 over the Internet in a wired or wireless manner. As a result, the home server 20 receives information regarding the positions of the wireless terminals H1 and H2 of the users registered in the home network system from the terminal server 10 through the communication module 21 and displays the received position information through the display unit 30, so that the home network system user can ascertain the positions of members of his/her family, not at home, when he/she is present in the home.

An alarm unit 40 is provided to sense a dangerous situation in the home, generate alarm data regarding the sensed situation and send the generated alarm data to the home server 20 so that it can be transferred to the wireless terminals H1 and H2 of the users registered in the home network system. Stored in the memory of the home server 20 are user information containing wireless terminal numbers of the family members, and an emergency telephone number list to which alarm data must be sent in the event of a dangerous situation. Hence, upon receiving the alarm data from the alarm unit 40, the home server 20 sends it to the wireless terminal numbers of the family members and wireless terminal numbers registered in the emergency telephone number list.

To this end, the home network system user has to input the wireless terminal numbers of the emergency telephone number list and family members to the home server 20 and register an Internet protocol (IP) address of the home server 20 in the terminal server 10 of a mobile communication company managing the wireless terminals H1 and H2, thereby enabling the terminal server 10 to send the position information of the wireless terminals H1 and H2 to the home server 20 and transfer the alarm data sent from the home server 20 to the wireless terminals H1 and H2 of the family members.

FIG. 2 is a block diagram showing the configuration of the first embodiment of the wireless terminal-interoperable home network system according to the present invention. As shown in this drawing, the wireless terminal-interoperable home network system comprises the registered user terminals H1 and H2, the terminal server 10, and the home server 20. The terminal server 10 is adapted to perform wireless communications with the terminals H1 and H2, and the display unit 30 and alarm unit 40 are attached to the body of the home server 20. In the home server 20, the communication module 21 acts to transmit and receive data to/from the terminal server 10 over a wired or wireless Internet network, the network interface 23 acts to transmit and receive data to/from a plurality of home appliances connected to the home network, and the microcomputer 22 acts to generate a control signal in response to an input control command such that a corresponding one of the home appliances is controlled according to the control command.

Further in the home server 20, the input unit 35 acts to receive a control command and setting information inputted from the home network system user, and the display unit 30 acts to display operation control results or position information of the family members sent from the terminal server 10.

The display unit 30 can be implemented by a liquid crystal display (LCD) monitor fixedly mounted on the home server body, or a Web pad-type monitor detachably mounted on the home server body. Alternatively, the display unit 30 may be implemented in a touch screen manner in which it is integrally formed with the input unit 35.

Further in the home server 20, the alarm unit 40 includes a fire/gas alarm sensor for sensing a fire or gas leak in the home, and an infrared sensor installed in an entrance of the home for sensing intrusion of an outsider into the home in the family's absence. These sensors provide their sensed values to the microcomputer 22 of the home server 20.

The microcomputer 22 generates alarm data on the basis of the sensed value from the fire/gas alarm sensor or infrared sensor and sends the generated alarm data to the terminal server 10 through the communication module 21. The terminal server 10 transfers the alarm data from the microcomputer 22 to the wireless terminals H1 and H2 of the subscribers (i.e., the family members and emergency telephone number list) registered therein.

FIG. 3 is a block diagram showing the configuration of the second embodiment of the wireless terminal-interoperable home network system according to the present invention. As shown in this drawing, the wireless terminal-interoperable home network system comprises the registered user terminals H1 and H2, and the terminal server 10 which performs wireless communications with the terminals H1 and H2. The home network system further comprises a home server 20a for transmitting and receiving data to/from the terminal server 10 over the Internet and controlling the states of a plurality of home appliances connected to the home network, and a display unit 30a connected to the home server 20a over the home network for displaying the results of operation control by the home server 20a or position information of the family members sent from the terminal server 10. The display unit 30a is preferably a stand-alone monitor device. The home network system further comprises an alarm unit 40a connected to the home server 20a over the home network for sensing a fire or gas leak in the home and intrusion of an outsider into the home in the family's absence.

In the second embodiment wherein the display unit 30a and alarm unit 40a are both of the stand-alone type, the display unit 30a and alarm unit 40a are not directly provided in the home server 20a, but can be implemented by existing networkable home appliances.

In this regard, the home server 20a includes a communication module 21a for Internet connection, a network interface 23a for interfacing over the home network, an input unit 35a for receiving a control command inputted from the home network system user, and a microcomputer 22a for generating a control signal in response to the control command inputted through the input unit 35a such that a corresponding one of the home appliances is controlled according to the control command.

The display unit 30a is a stand-alone device networkable with the home server 20a, such as a TV or computer. In this connection, the display unit 30a includes a network interface 31a for receiving position information sent from the home server 20a over the home network, a display drive microcomputer 32a for processing an image signal such that the received position information is displayed in map form or text form, and a display 33a for externally displaying the received position information under the control of the display drive microcomputer. Of course, the home server 20a may send the position information to an audio unit (not shown) connected to the home network so that it can be outputted in voice form.

Further, in the second embodiment, the alarm unit 40a is a stand-alone device which is separately installed in the entrance or kitchen of the home and connected to the home server 20a over the home network. In this regard, the alarm unit 40a includes a network interface 41a for transmitting and receiving data to/from the home server 20a over the home network, an alarm sensor 42a for sensing a fire or gas leak through the atmosphere in the home, an infrared sensor 43a installed in the entrance of the home for sensing intrusion of an outsider into the home in the family's absence, and an alarm unit microcomputer 44a for generating alarm data on the basis of a sensed value from the alarm sensor 42a or infrared sensor 43a and sending the generated alarm data to the home server 20a.

Then, the microcomputer 22a of the homer server 20a receives the alarm data from the alarm unit microcomputer 44a and sends it to the terminal server 10 through the communication module 21a. The terminal server 10 transfers the alarm data from the microcomputer 22a to the wireless terminals H1 and H2 of the subscribers (i.e., the family members and emergency telephone number list) registered therein.

FIG. 4 is a block diagram showing the configuration of the third embodiment of the wireless terminal-interoperable home network system according to the present invention. In the third embodiment, a display unit 30b is directly provided in a home server 20b and an alarm unit 40b is a separate stand-alone device which is installed in the entrance or the like of the home and connected to the home server 20b over the home network.

As shown in FIG. 4, the home network system according to the third embodiment comprises the registered user terminals H1 and H2, the terminal server 10, the home server 20b, and the alarm unit 40b. The terminal server 10 is adapted to perform wireless communications with the terminals H1 and H2, and the display unit 30b is attached to the body of the home server 20b. The home server 20b acts to control a plurality of home appliances connected to the home network. The alarm unit 40b is connected to the home server 20b over the home network to sense a fire or gas leak in the home and intrusion of an outsider into the home in the family's absence.

In the third embodiment, the home server 20b includes a communication module 21b for transmitting and receiving data to/from the terminal server 10 over a wired or wireless Internet network, a network interface 23b for transmitting and receiving data to/from the plurality of home appliances connected to the home network, a microcomputer 22b for generating a control signal in response to an input control command such that a corresponding one of the home appliances is controlled according to the control command, an input unit 35b for receiving a control command, and a display unit 30b for displaying the results of operation control by the home server 20b or position information of the family members sent from the terminal server 10.

The alarm unit 40b is the same in construction as the alarm unit 40a in the second embodiment and a description thereof will thus be omitted.

An alarm unit microcomputer 44b, which constitutes a part of the alarm unit 20b, generates alarm data and sends it to the terminal server 10 through the microcomputer 22b and communication module 21b of the home server 20b. The terminal server 10 transfers the alarm data from the home server 20b to the wireless terminals H1 and H2 of the subscribers (i.e., the family members and emergency telephone number list) registered therein, so as to inform the subscribers that a dangerous situation has occurred in the home.

As described above, according to the present invention, the home server 20, 20a or 20b, which manages/controls the home network system, and the terminal server 10, which controls the wireless terminals H1 and H2, perform mutual data communication so that the home network system user can ascertain the position of at least one member of his/her family, not at home, when he/she is present in the home and notify the family member of a dangerous situation occurring in the home, thereby making it possible to rapidly cope with the dangerous situation. It should be noted that the position information and alarm data can be outputted in various forms such as a text, image, voice, etc., not limited by the first to third embodiments disclosed in the specification and shown in the drawings.

As apparent from the above description, the present invention provides a wireless terminal-interoperable home network system wherein a terminal server is adapted to process data transmitted and received through wireless terminals, and a home server is adapted to manage/control a home network and communicate with the terminal server. A text message inputted through a wireless terminal or information regarding the position of the wireless terminal can be displayed through a display unit installed in a home. Also, an alarm unit senses a dangerous situation occurring in the home in a family's absence to generate alarm data, which is then sent to a wireless terminal of a registered user existing in a remote location. Therefore, the family members can easily perform mutual communication and rapidly cope with a dangerous situation in the home even when they are not at home, thereby increasing security in the home.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home network system interoperable with a wireless terminal of at least one user registered therein, comprising:
   a terminal server that detects a position of said wireless terminal and transmits and receives voice messages, text messages or multimedia data to/from said wireless terminal; and
   a home server connected with said terminal server over the internet, said home server sending, to said terminal server, alarm data regarding a dangerous situation in a home where a home network is constructed, receiving information regarding the position of said wireless terminal from said terminal server and displaying the received position information,
   wherein said home server includes a communication module that transmits and receives data to/from said terminal server over said Internet;
   a network interface that transmits and receives data to/from a plurality of home appliances connected to said home network;
   a microcomputer that processes data to monitor the state or control operation of said home appliances through said network interface; and
   input device that sets and inputs information of said user registered in said home network system,
   wherein said home server further includes a display device that displays state information of said home appliances connected to said home network or said data transmitted and received to/from said terminal server under control of said microcomputer.

2. The home network system as set forth in claim 1, wherein said terminal server includes:
   a wireless communication module that transmits and receives data to/from said wireless terminal of said registered user;
   a position information output unit that reads and outputs the position information of said wireless terminal contained in said data transmitted and received to/from said wireless terminal;
   a wired communication module that transmits and receives data to/from said home server over said Internet; and
   a controller that controls a data flow such that said position information of said wireless terminal is sent to said home server in response to a request therefrom and said alarm data sent from said home server is transferred to said wireless terminal.

3. The home network system as set forth in claim 1, wherein said display device is a touch screen integrally formed with said input device.

4. The home network system as set forth in claim 1, wherein said display device is detachably mounted on a body of said home server.

5. The home network system as set forth in claim 1, wherein said home server further includes an alarm sensor that senses a fire or gas leak through an atmosphere in the home and transfers the sensed result to said microcomputer so that alarm data regarding the fire or gas leak can be generated by said microcomputer.

6. The home network system as set forth in claim 1, wherein said home server further includes an infrared sensor that senses intrusion of an outsider into the home through infrared rays emitted from an object moving in the home and transfers the sensed result to said microcomputer so that alarm data regarding the outsider intrusion can be generated by said microcomputer.

7. The home network system as set forth in claim 1, further comprising said display device connected to said home server over said home network, said display device displaying state information of said home appliances or said data transmitted and received to/from said terminal server.

8. The home network system as set forth in claim 7, wherein said display device includes:
   a second network interface that transmits and receives data to/from said home server over said home network;
   a display drive microcomputer that processes an image signal such that said data transmitted and received through said second network interface is displayed; and
   a display that displays said image signal processed by said display drive microcomputer.

9. The home network system as set forth in claim 1, further comprising an alarm connected to said home server over said home network, said alarm sensing a dangerous situation in the home through an atmosphere or infrared rays in the home, generating alarm data based on the sensed dangerous situation and sending the generated alarm data to said home server.

10. The home network system as set forth in claim 9, wherein said alarm includes:
    a second network interface that transmits and receives data to/from said home server over said home network;
    an alarm sensor that senses a fire or gas leak through the atmosphere in the home;
    an infrared sensor that senses intrusion of an outsider into the home through the infrared rays in the home, said infrared rays being emitted from an object moving in the home; and
    an alarm unit microcomputer that generates alarm data based on a sensed result from said alarm sensor or infrared sensor and sending the generated alarm data to said home server through said second network interface.

* * * * *

UNITED STATES PATENT AND TRADEMARK OFFICE
CERTIFICATE OF CORRECTION

PATENT NO. : 7,254,403 B2 Page 1 of 1
APPLICATION NO. : 10/759018
DATED : August 7, 2007
INVENTOR(S) : La et al.

It is certified that error appears in the above-identified patent and that said Letters Patent is hereby corrected as shown below:

At cover page, item (73) Assignee: "LG Electronics Inc. Aeoul" should be --LG Electronics Inc. Seoul--

Signed and Sealed this

Twentieth Day of May, 2008

JON W. DUDAS
*Director of the United States Patent and Trademark Office*